United States Patent
Beach et al.

(10) Patent No.: US 10,100,243 B2
(45) Date of Patent: Oct. 16, 2018

(54) ENVIRONMENTALLY PREFERABLE MICROEMULSION COMPOSITION

(71) Applicant: KMP HOLDINGS, LLC, Wichita, KS (US)

(72) Inventors: Sean R. Beach, Duncan, OK (US); Joel A. Hebert, Youngsville, LA (US); Derek C. Mouton, Youngsville, LA (US)

(73) Assignee: KMP HOLDINGS, LLC, Wichita, KS (US)

( * ) Notice: Subject to any disclaimer, the term of this patent is extended or adjusted under 35 U.S.C. 154(b) by 0 days.

(21) Appl. No.: 15/199,145

(22) Filed: Jun. 30, 2016

(65) Prior Publication Data

US 2017/0015898 A1 Jan. 19, 2017

Related U.S. Application Data

(60) Provisional application No. 62/191,938, filed on Jul. 13, 2015.

(51) Int. Cl.
| | |
|---|---|
| *C09K 8/60* | (2006.01) |
| *C09K 8/68* | (2006.01) |
| *C09K 8/86* | (2006.01) |
| *C09K 8/28* | (2006.01) |
| *C09K 8/035* | (2006.01) |
| *C09K 8/528* | (2006.01) |
| *C09K 8/84* | (2006.01) |
| *C09K 8/88* | (2006.01) |
| *C09K 8/90* | (2006.01) |

(52) U.S. Cl.
CPC .............. *C09K 8/602* (2013.01); *C09K 8/035* (2013.01); *C09K 8/528* (2013.01); *C09K 8/845* (2013.01); *C09K 8/86* (2013.01); *C09K 8/885* (2013.01); *C09K 8/90* (2013.01); *C09K 2208/04* (2013.01); *C09K 2208/32* (2013.01)

(58) Field of Classification Search
None
See application file for complete search history.

(56) References Cited

U.S. PATENT DOCUMENTS

| | | | | |
|---|---|---|---|---|
| 3,902,557 | A | * | 9/1975 | Shaughnessy ........... C09K 8/56 166/281 |
| 4,525,496 | A | | 6/1985 | Adaway et al. |
| 4,600,761 | A | | 7/1986 | Ruffner et al. |
| 4,743,698 | A | | 5/1988 | Ruffner et al. |
| 5,470,822 | A | * | 11/1995 | Younes .................... C09K 8/36 507/133 |

(Continued)

FOREIGN PATENT DOCUMENTS

| | | |
|---|---|---|
| CA | 2662933 A1 | 4/2008 |
| CN | 103509541 A | 1/2014 |

(Continued)

*Primary Examiner* — Jeffrey Washville

(57) ABSTRACT

The present invention relates to an environmentally preferable microemulsion composition that is suitable for formation stimulation, remediation, and drilling operations, and a method to make and use the same. Specifically, the environmentally preferable microemulsion composition of the present invention can comprise glycol ether, terpene, ethoxylated alcohol, polyoxyethylene sorbitan ester, and a carrier fluid.

13 Claims, 1 Drawing Sheet

(56) References Cited

U.S. PATENT DOCUMENTS

| | | | |
|---|---|---|---|
| 5,788,781 A * | 8/1998 | Van Slyke | B09C 1/025 134/26 |
| 5,968,990 A † | 10/1999 | Jon | |
| 6,051,542 A † | 4/2000 | Pollack | |
| 6,090,765 A † | 7/2000 | Black | |
| 7,392,844 B2 | 7/2008 | Berry et al. | |
| 7,392,845 B2 | 7/2008 | Berry et al. | |
| 7,687,439 B2 | 3/2010 | Jones et al. | |
| 7,728,064 B2 | 6/2010 | Fukumori et al. | |
| 8,091,644 B2 | 1/2012 | Clark et al. | |
| 8,091,645 B2 | 1/2012 | Quintero et al. | |
| 8,091,646 B2 | 1/2012 | Quintero et al. | |
| 8,628,626 B2 † | 1/2014 | Fluck | |
| 8,710,066 B2 | 4/2014 | Murata | |
| 8,871,695 B2 | 10/2014 | Quintero et al. | |
| 2002/0125010 A1 * | 9/2002 | Collins | C09K 8/36 166/279 |
| 2004/0075074 A1 | 4/2004 | Kubota et al. | |
| 2005/0139356 A1 † | 6/2005 | Prukop | |
| 2005/0187112 A1 | 8/2005 | Goodhue, Jr. et al. | |
| 2006/0073986 A1 | 4/2006 | Jones et al. | |
| 2006/0096758 A1 | 5/2006 | Berry et al. | |
| 2007/0027253 A1 | 2/2007 | Jones et al. | |
| 2008/0110618 A1 | 5/2008 | Quintero et al. | |
| 2008/0274918 A1 | 11/2008 | Quintero et al. | |
| 2008/0287324 A1 * | 11/2008 | Pursley | C09K 8/52 507/218 |
| 2008/0314592 A1 | 12/2008 | Clark et al. | |
| 2009/0008091 A1 | 1/2009 | Quintero et al. | |
| 2009/0325826 A1 | 12/2009 | Quintero et al. | |
| 2010/0263863 A1 | 10/2010 | Quintero et al. | |
| 2011/0278004 A1 | 11/2011 | Ali et al. | |
| 2012/0316090 A1 | 12/2012 | Chang et al. | |
| 2013/0126158 A1 † | 5/2013 | Gupta | |
| 2013/0244913 A1 | 9/2013 | Maberry et al. | |
| 2013/0261033 A1 | 10/2013 | Nguyen | |
| 2014/0131039 A1 | 5/2014 | Reichenbach-Klinke et al. | |
| 2014/0338911 A1 † | 11/2014 | Dismuke | |
| 2015/0031588 A1 | 1/2015 | Quintero et al. | |
| 2015/0053404 A1 † | 2/2015 | Penny | |
| 2015/0094383 A1 * | 4/2015 | Bernhardt | C11D 1/65 514/785 |
| 2015/0218920 A1 | 8/2015 | Qunitero et al. | |
| 2015/0329767 A1 | 11/2015 | Vaughn et al. | |
| 2017/0114272 A1 † | 4/2017 | Vo | |

FOREIGN PATENT DOCUMENTS

| | | | |
|---|---|---|---|
| CN | 103540297 A | | 1/2014 |
| CN | 103897671 A | | 7/2014 |
| CN | 104232049 A | | 12/2014 |
| EP | 106513 A2 | | 4/1984 |
| EP | 197635 A2 | | 10/1986 |
| EP | 217485 B1 | | 7/1991 |
| EP | 1786879 B1 | | 2/2012 |
| FR | 2984910 A1 | | 6/2013 |
| JP | 11171914 A | | 6/1999 |
| JP | 4467105 B2 | | 5/2010 |
| JP | 4760707 B2 | | 8/2011 |
| KR | 100807451 B1 | | 2/2008 |
| WO | 2005041661 | † | 5/2005 |
| WO | 2006029019 A2 | | 3/2006 |
| WO | 2009006251 A1 | | 1/2009 |
| WO | 2009158478 A2 | | 12/2009 |
| WO | 2014023988 A1 | | 2/2013 |
| WO | 2013158989 A1 | | 10/2013 |
| WO | 2014075964 A1 | | 5/2014 |
| WO | 2015119761 A1 | | 8/2015 |

\* cited by examiner
† cited by third party

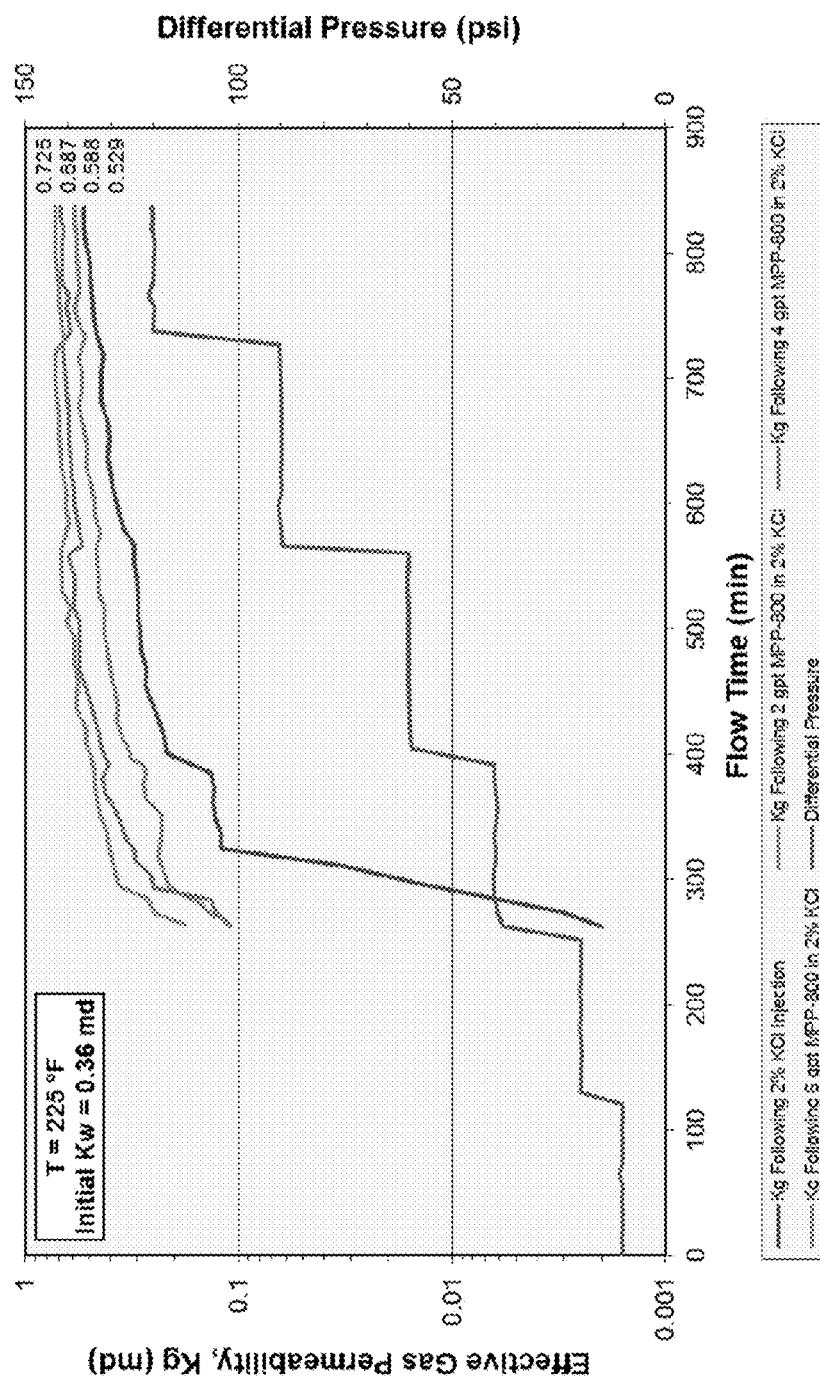

ENVIRONMENTALLY PREFERABLE MICROEMULSION COMPOSITION

CROSS-REFERENCE TO RELATED APPLICATION

This application claims priority to U.S. Provisional Patent Application No. 62/191,938, filed on Jul. 13, 2015, which is hereby incorporated by reference in its entirety.

TECHNICAL FIELD

The present invention relates to an environmentally preferable microemulsion composition that is suitable for formation stimulation, remediation, and drilling operations, and a method to make and use the same. Specifically, the environmentally preferable microemulsion composition of the present invention can comprise glycol ether, terpene, ethoxylated alcohol, polyoxyethylene sorbitan ester, and a carrier fluid.

BACKGROUND

One of the primary methods for well stimulation in the production of hydrocarbons is hydraulic fracturing. Hydraulic fracturing is a method of using pump rate and hydraulic pressure to fracture or crack a subterranean formation. Once the fractures are made, high conductivity proppant is pumped into the fracture via fracturing fluid to prop open the cracks. When the pump rates and pressures are reduced or removed from the formation, the fracture cannot close or heal completely because the high conductivity proppant props the fracture open. The propped fractures provide a high conductivity path connecting the producing wellbore and a larger formation area to enhance the production of hydrocarbons.

The recovery of hydrocarbons from a subterranean formation leaves a substantial amount of the initial hydrocarbons still in the formation. During the production of desirable hydrocarbons such as crude oil and natural gas, a number of other naturally occurring substances may also be encountered within the subterranean environment.

The removal of unwanted deposits from the wellbore and production equipment is generally referred to as "remediation." In contrast, the term "stimulation" generally refers to the treatment of geological formations to improve the recovery of hydrocarbons. Common stimulation techniques include hydraulic fracturing, acidizing, and coiled tubing operations. Well remediation and stimulation are important services that are offered through a variety of techniques by a large number of companies.

Oil and natural gas are found in, and produced from, porous and permeable subterranean formations. The porosity and permeability of the formation determine its ability to store hydrocarbons and the facility with which the hydrocarbons can be extracted from the formation.

Both porosity and permeability are geometric properties of a rock, and both are the result of its lithological (composition) character. A rock with pores is referred to as porous. This means it has tiny holes through which oil may flow. Reservoir rocks must be porous, because hydrocarbons can occur only in pores. A suitable reservoir rock must therefore be porous, permeable, and contain enough hydrocarbons to make it economically feasible for the operating company to drill for and produce them.

Capillary pressure is important in reservoir engineering because it is a major factor controlling the fluid distributions in a reservoir rock. Capillary pressure is only observable in the presence of two immiscible fluids in contact with each other in capillary-like tubes. The small pores in a reservoir rock are similar to capillary tubes and usually contain two immiscible fluid phases in contact with each other. Thus capillary pressure becomes an important factor to be considered when dealing with reservoir rocks.

The larger the pore radius, the lower the capillary pressure is. Low capillary pressure and low irreducible water saturation are associated with reservoir rocks that have large pores, such as coarse-grained sand. It naturally follows that high capillary pressure and high water saturations are associated with fine grained reservoir rocks. As a result, in tight formations the capillary pressure will be high. It is difficult to produce the hydrocarbon without reducing the capillary pressure. Removing water from pores is critical to reducing the capillary pressure.

Thus, if a fracturing fluid formulation can effectively reduce the water saturation within fine grained reservoir rocks, it will provide greater oil/gas productivity in this kind of subterranean formation.

The use of certain microemulsion additives during completion of both oil and gas wells leads to higher permeability and long-term increased production of hydrocarbons from the well. The increased displacement of water from the formation and proppant by both oil and gas (flowback) and consequent increased production of hydrocarbons have been attributed to lowered capillary pressure. In porous media, capillary pressure is the force necessary to squeeze a hydrocarbon droplet through a pore throat (works against the interfacial tension between the oil and water phases) and is higher for smaller pore diameters. Lowered capillary pressure may also lead to higher gas/oil permeability of subterranean formations. However, previous solvent-hydrocarbon surfactant systems have limitations in their ability to lower capillary pressure, especially for fine grained reservoir rocks. There is, therefore, a need for treatment compositions that are capable of lowering capillary pressure and the water saturation within reservoir formations while maintaining the desirable properties of conventional emulsified treatment formulations.

The types and uses of fracturing fluids have evolved greatly over the past 70 years and continue to evolve. The U.S. oil and gas industry has utilized fluids for fracturing geologic formations since the early 1940s. Available scientific literature indicates that hydraulic fracturing fluid performance became a prevalent research topic in the late 1980s and the 1990s. Most of the literature pertaining to fracturing fluids relates to the fluids' operational efficiency rather than their potential environmental impacts.

Although a number of microemulsion compositions are known in the prior art, such as MA-844W, which is developed by CESI Chemical and disclosed in U.S. Pat. No. 7,380,606, it is a flammable liquid due to the higher quantity of organic solvents in the composition and the lower flash point, i.e., 25° C. (see https://www.cows.bz/Assets/pdfs/tds-acid/MA-844W%20Micro%20Emulsion%20%TDS.pdf).

Thus, there is a continued need for more effective and also environmentally preferable compositions for formation stimulation, remediation, and drilling operations.

BRIEF DESCRIPTION OF THE DRAWINGS

FIG. 1 is a graph illustrating gas permeability response with Example 1-treated Ohio sandstone plugs.

OBJECTIVE AND SUMMARY OF THE PRESENT INVENTION

The primary objective of the present invention is to identify and develop an environmentally preferable and highly effective composition for stimulating oil and gas production by removing clay-bound water even at residual water saturation.

To overcome the problems related to the currently available microemulsion products, the present invention provides a novel microemulsion composition as a stimulation, remediation, and drilling operation fluid. The novel microemulsion composition in the present invention may be used in increasing the relative permeability of a hydrocarbon stream, e.g. oil, gas, and the like; decreasing water saturation of a hydrocarbon stream; reducing phase trapping and water-block in the reservoir; reducing the interfacial tension at the rock-fluid interface; manipulating the contact angle at the rock-fluid interface; reducing the water/oil interfacial tension; keeping the reservoir surfaces water-wet; and combinations thereof. In addition, the present invention provides a composition that is environmentally more preferable. More specifically, the present invention provides less hazardous, more environmentally preferable microemulsion compositions.

One particular characteristic of the present invention over the prior art is the ability to effectively remove clay-bound water from shale, sandstone, and carbonate formations. In many cases, the prior art demonstrates effectiveness in draining the fracture load water. However, once the system reaches residual water saturation (Swi), there is no improvement in relative permeability to hydrocarbons. This means that no additional clay-bound water can be removed, and oil or gas production is blocked due to mechanisms such as water blocking or phase trapping. A significant increase and maintenance of the relative gas permeability may lead to a much higher yield of oil or gas. Example 1 in the present invention has demonstrated a significant increase in relative permeability to gas ($K_g$) even at residual water saturation, which has been demonstrated to persist over extended periods of time, as illustrated in FIG. 1.

In one embodiment, the present invention provides a microemulsion composition comprising glycol ether, terpene, ethoxylated alcohol, and polyoxyethylene sorbitan ester.

In another embodiment, the present invention provides a microemulsion composition comprising glycol ether, terpene, ethoxylated alcohol, polyoxyethylene sorbitan ester, and a carrier fluid.

In yet another preferred embodiment, the present invention provides a microemulsion composition comprising:
  i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
  ii. D-Limonene;
  iii. ethoxylated alcohol made from a distribution of $C_9$, $C_{10}$, and $C_{11}$ linear alcohols with an average of 6 moles of ethylene oxide;
  iv. polyoxyethylene sorbitan trioleate; and
  v. water.

In a further embodiment, the present invention provides a method for preparing a microemulsion composition, comprising blending said glycol ether, terpene, ethoxylated alcohol, polyoxyethylene sorbitan ester, and a fluid carrier to provide a substantially transparent microemulsion composition.

In a further embodiment, the present invention provides a method for treating an oil or gas well comprising introducing a microemulsion composition of the present invention into an oil or gas well.

DETAILED DESCRIPTION OF THE INVENTION

The present invention provides a novel environmentally preferable microemulsion composition that is suitable for formation stimulation, remediation, and drilling operations, and a method to make and use the same. The environmentally preferable microemulsion composition of the present invention comprises glycol ether, terpene, ethoxylated alcohol, polyoxyethylene sorbitan ester, and water. The environmentally preferable microemulsion composition is also less flammable and therefore less hazardous than some currently available products on the market such as MA-844W.

The environmentally preferable microemulsion composition of the present invention provides a significantly enhanced water removal capability when draining fracture load and clay-bound water. Without effective drainage of the imbibed fracture-load water and any water that is taken up by clays that have been in a dehydrated state, production of oil or gas will be blocked by the retained water. In some formations, up to 100% of the fracture load water does not flow back and remains in the formation. The lower the permeability and porosity of the formation, the greater the opportunity for formation damage if the fracture load is not recovered. The environmentally preferable microemulsion composition of the present invention may substantially improve oil or gas production by increasing and maintaining the gas permeability. The disclosed microemulsion may also provide other desirable characteristics such as decreasing water saturation of a hydrocarbon stream, reducing capillary pressure and water-block in the reservoir, enhancing the solubilization and dispersion of viscoelastic surfactant molecules, reducing the interfacial tension at the rock-fluid interface, manipulating the contact angle at the rock-fluid interface, reducing the water/oil interfacial tension, keeping the reservoir surfaces water-wet, and combinations thereof.

Glycol Ethers

Glycol ether, or a combination of glycol ethers, in the present invention has the structure according to Formula I:

$$R^1O[(C_mH_{2m})O]_nH \qquad \text{(Formula I)}$$

wherein $R^1$ is a $C_1$-$C_{12}$ straight or branched alkyl, m is 2 to 10, n is 1 to 10, and at least one of the hydrogens on any carbon may be optionally substituted with —$OR^2$, Cl, or F, wherein ($C_mH_{2m}$) may be a straight or branched alkyl chain, and $R^2$ is H or a $C_1$-$C_6$ straight or branched alkyl.

Preferred $R^1$ is $C_1$-$C_4$ straight or branched alkyl, m is 2 to 4, and n is 2 to 4.

More preferred $R^1$ is a methyl group, m is 3, and n is 2.

Preferred glycol ether, or a combination of glycol ethers, in the present invention has the structure according to Formula I':

$$R^1O[(C_{m'}H_{2m'})O]_{n'}H \qquad \text{(Formula I')}$$

wherein $R^1$ is a $C_1$-$C_4$ straight or branched alkyl, m' is 2 to 4, n' is 2 or 4, and at least one of hydrogens on any carbon may be optionally substituted with —$OR^2$, Cl, or F, wherein ($C_{m'}H_{2m'}$) may be a straight or branched alkyl chain, and $R^2$ is H or a $C_1$-$C_6$ straight or branched alkyl.

A more preferred glycol ether in the present invention is a compound according to the formula $CH_3O[CH_2CH(CH_3)$ O]$_2$H, CH$_3$O[CH(CH$_3$)CH$_2$O]$_2$H, or CH$_3$O(CH$_2$CH$_2$CH$_2$O)$_2$H, or a combination thereof.

Glycol ether in the present invention may serve as a coupling agent and low surface tension solvent.

Terpenes

Terpene in the present invention may be any terpene with generic formula of (C$_5$H$_8$)$_n$, where n is 1 to 20. The n of a preferred terpene is 1 to 8.

Terpene in the present invention may be any terpenoid, which can be thought of as a modified terpene, wherein a methyl group may be moved or removed, or oxygen atoms may be added, or the ring has been modified to a saturated, unsaturated, or aromatic ring. For example, if the six-membered ring of a standard monoterpene is modified to a phenyl ring, it may have a formula of C$_{10}$H$_{14}$.

One particularly preferred terpene is D-Limonene.

Terpene in the present invention may serve as a solvent and a cleaning agent.

Ethoxylated Alcohol

Ethoxylated alcohol, or a combination of ethoxylated alcohols, in the present invention has the structure according to Formula III:

R$^1$(OCH$_2$CH$_2$O)$_y$H     (Formula III)

wherein R$^1$ is H or a C$_2$-C$_{18}$ straight or branched alkyl, and y is 1 to 10.

Preferred R$^1$ is a C$_5$-C$_{12}$ straight or branched alkyl, and preferred y is 3 to 8.

More preferred R$^1$ is a C$_9$-C$_{11}$ straight or branched alkyl, and more preferred y is 4 to 6.

Preferred ethoxylated alcohol, or a combination of ethoxylated alcohols, in the present invention has the structure according to Formula III':

R$^{1'}$(OCH$_2$CH$_2$O)$_{y'}$H     (Formula III')

wherein R$^{1'}$ is a C$_5$-C$_{12}$ straight or branched alkyl, and y' is 3-8.

More preferred ethoxylated alcohol, or a combination of ethoxylated alcohols, in the present invention has the structure according to Formula III":

R$^{1''}$(OCH$_2$CH$_2$O)$_{y''}$H     (Formula III")

wherein R$^{1''}$ is a C$_9$-C$_{11}$ straight or branched alkyl, and y" is 4 to 6.

A particularly preferred ethoxylated alcohol in the present invention is an ethoxylated alcohol or a mixture of ethoxylated alcohols made from a distribution of C$_9$, C$_{10}$, and C$_{11}$ linear alcohols with an average of 6 moles of ethylene oxide.

Ethoxylated alcohol in the present invention may serve as a surfactant or co-emulsifier to ensure the formation of a microemulsion.

Polyoxyethylene Sorbitan Esters

Suitable polyoxyethylene sorbitan ester in the present invention is a class of sorbitan C$_{10}$-C$_{18}$ fatty acid esters with multiple ethylene oxides. The number of ethylene oxides may be from 2 to 60.

Preferred polyoxyethylene sorbitan esters in the present invention include but are not limited to polyoxyethylene sorbitan monooleate, polyoxyethylene sorbitan dioleate, polyoxyethylene sorbitan trioleate, polyoxyethylene sorbitan monopalmitate, polyoxyethylene sorbitan dipalmitate, and polyoxyethylene sorbitan tripalmitate.

A more preferred polyoxyethylene sorbitan ester is polyoxyethylene sorbitan trioleate.

Polyoxyethylene sorbitan ester in the present invention may serve as a surfactant or co-surfactant, a hydrophile-lipophile balance (HLB) modifier, and an emulsifier that may help fluid to penetrate into rocks. Polyoxyethylene sorbitan ester may also help the microemulsion to invert.

Carrier Fluid

Carrier fluid in the present invention may be water-based or oil-based. Water-based carrier fluid may include but is not limited to fresh water, brine (e.g., NaCl or KCl aqueous solution), or up to 28% weight percent of aqueous hydrochloric acid, formic acid, acetic acid, hydrofluoric acid or combinations thereof. The water-based carrier fluid is more environmentally preferable and more economic. Oil-based carrier fluid may be high flash point mineral oils such as ODC® oils, EFC crystal 205ST, or EFC crystal 180, or synthetic oils such as C-14 olefin oil. High flash point mineral oils and/or synthetic oils may provide enhanced performance but are generally more expensive and environmentally restricted. Skilled artisans will appreciate that some low flash point oils or materials such as diesel may be used as carrier fluids to provide a microemulsion composition with comparable effect in removing clay-bound water even at residual water saturation, although they may not be environmentally preferable.

Water-based carrier fluid is preferred in the present disclosure because it provides a much higher flash point and therefore is less hazardous.

Embodiments of the Present Invention

In one embodiment, the present invention provides a microemulsion composition comprising glycol ether, terpene, ethoxylated alcohol, and polyoxyethylene sorbitan ester.

In another embodiment, the present invention provides a microemulsion composition comprising glycol ether, terpene, ethoxylated alcohol, polyoxyethylene sorbitan ester, and a carrier fluid.

In any embodiment of the present invention, a preferred glycol ether is a compound according to Formula I.

In any embodiment of the present invention, a more preferred glycol ether is a compound according to Formula I'.

In any embodiment of the present invention, an even more preferred glycol ether is a compound according to formula CH$_3$O[CH$_2$CH(CH$_3$)O]$_2$H, CH$_3$O[CH(CH$_3$)CH$_2$O]$_2$H, or CH$_3$O(CH$_2$CH$_2$CH$_2$O)$_2$H, or a combination thereof.

In any embodiment of the present invention, a preferred terpene is a compound according to formula (C$_5$H$_8$)$_n$, where n is 1 to 20.

In any embodiment of the present invention, a more preferred terpene is D-Limonene.

In any embodiment of the present invention, an ethoxylate alcohol is a compound according to Formula III.

In any embodiment of the present invention, a preferred ethoxylate alcohol is a compound according to Formula III'.

In any embodiment of the present invention, a more preferred ethoxylate alcohol is a compound according to Formula III".

In any embodiment of the present invention, an even more preferred ethoxylate alcohol is a compound or a mixture of compounds made from a distribution of C$_9$, C$_{10}$, and C$_{11}$ linear alcohols with an average of 6 moles of ethylene oxide.

In any embodiment of the present invention, a polyoxyethylene sorbitan ester is a class of sorbitan $C_{10}$-$C_{18}$ fatty acid esters with multiple ethylene oxides.

In any embodiment of the present invention, a preferred polyoxyethylene sorbitan ester is polyoxyethylene sorbitan monooleate, polyoxyethylene sorbitan dioleate, polyoxyethylene sorbitan trioleate, polyoxyethylene sorbitan monopalmitate, polyoxyethylene sorbitan dipalmitate, or polyoxyethylene sorbitan tripalmitate.

In any embodiment of the present invention, a more preferred polyoxyethylene sorbitan ester is polyoxyethylene sorbitan trioleate.

In any embodiment of the present invention, a preferred carrier fluid is up to 28% weight percent of aqueous hydrochloric acid, formic acid, acetic acid, hydrofluoric acid or combinations thereof.

In any embodiment of the present invention, an even more preferred carrier fluid comprises fresh water or brine (e.g., NaCl or KCl aqueous solution).

In another embodiment, the present invention provides a microemulsion composition comprising:
   i. a glycol ether according to Formula I;
   ii. a terpene;
   iii. an ethoxylated alcohol according to Formula III;
   iv. a polyoxyethylene sorbitan ester; and
   v. a carrier fluid.

In yet another embodiment, the present invention provides a microemulsion composition comprising:
   i. a glycol ether according to Formula I';
   ii. a terpene;
   iii. an ethoxylated alcohol according to Formula III;
   iv. a polyoxyethylene sorbitan ester; and
   v. a carrier fluid.

In yet another embodiment, the present invention provides a microemulsion composition comprising:
   i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
   ii. a terpene;
   iii. an ethoxylated alcohol according to Formula III;
   iv. a polyoxyethylene sorbitan ester; and
   v. a carrier fluid.

In yet another embodiment, the present invention provides a microemulsion composition comprising:
   i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
   ii. a terpene according to formula $(C_5H_8)_n$, where n is 1 to 20;
   iii. an ethoxylated alcohol according to Formula III;
   iv. a polyoxyethylene sorbitan ester; and
   v. a carrier fluid.

In yet another embodiment, the present invention provides a microemulsion composition comprising:
   i. a glycol ether selected from the group consisting of $CH_3O[CH_2CH(CH_3)O_2]H$, $CH_3O[CH(CH_3)CH_2O]_2H$, $CH_3O(CH_2CH_2CH_2O)_2H$, and any combination thereof;
   ii. D-Limonene;
   iii. an ethoxylated alcohol according to Formula III;
   iv. a polyoxyethylene sorbitan ester; and
   v. a carrier fluid.

In yet another embodiment, the present invention provides a microemulsion composition comprising:
   i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
   ii. D-Limonene;
   iii. an ethoxylated alcohol according to Formula III';
   iv. a polyoxyethylene sorbitan ester; and
   v. a carrier fluid.

In yet another embodiment, the present invention provides a microemulsion composition comprising:
   i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
   ii. D-Limonene;
   iii. an ethoxylated alcohol according to Formula III";
   iv. a polyoxyethylene sorbitan ester; and
   v. a carrier fluid.

In yet another embodiment, the present invention provides a microemulsion composition comprising:
   i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
   ii. D-Limonene;
   iii. an ethoxylated alcohol or a combination of ethoxylated alcohols made from a distribution of $C_9$, $C_{10}$, and $C_{11}$ linear alcohols with an average of 6 moles of ethylene oxide;
   iv. a polyoxyethylene sorbitan ester; and
   v. a carrier fluid.

In yet another embodiment, the present invention provides a microemulsion composition comprising:
   i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
   ii. D-Limonene;
   iii. an ethoxylated alcohol made from a distribution of $C_9$, $C_{10}$, and $C_{11}$ linear alcohols with an average of 6 moles of ethylene oxide;
   iv. a polyoxyethylene sorbitan ester selected from the group consisting of polyoxyethylene sorbitan monooleate, polyoxyethylene sorbitan dioleate, polyoxyethylene sorbitan trioleate, polyoxyethylene sorbitan monopalmitate, polyoxyethylene sorbitan dipalmitate, polyoxyethylene sorbitan tripalmitate, and any combination thereof; and
   v. a carrier fluid.

In yet another embodiment, the present invention provides a microemulsion composition comprising:
   i. a glycol ether selected from the group consisting of $CH_3O[Ch_2CH(CH_3)O]_2H$, $CH_3O[CH(CH_3)CH_2O]_2H$, $CH_3O(CH_2CH_2CH_2O)_2H$, and combination thereof;
   ii. D-Limonene;
   iii. an ethoxylated alcohol made from a distribution of $C_9$, $C_{10}$, and $C_{11}$ linear alcohols with an average of 6 moles of ethylene oxide;
   iv. polyoxyethylene sorbitan trioleate; and
   v. a carrier fluid.

In yet another embodiment, the present invention provides a microemulsion composition comprising:
   i. a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof;
   ii. D-Limonene;

iii. an ethoxylated alcohol made from a distribution of $C_9$, $C_{10}$, and $C_{11}$ linear alcohols with an average of 6 moles of ethylene oxide;
iv. polyoxyethylene sorbitan trioleate; and
v. water.

Scale is the precipitate that forms on surfaces in contact with water as a result of the precipitation of normally soluble solids that become insoluble as temperature increases. The chemical treatment of water associated with oil and gas includes the application of scale inhibitors, such as phosphonates, to help maintain the integrity of equipment that is used during the drilling and production phases. Treatment is used to reduce the concentration of scale forming compounds that can accumulate in production wells, water and disposal wells, and surface equipment. The accumulation of scale can reduce flow rates or, for instance, lower efficiencies in heat exchangers. Scale inhibiting chemicals can be applied upstream or downstream of the wellhead or directly to the well via hydraulic fracturing and are in general classified into four categories: Oil-Miscible, Totally Water Free, Emulsified, and Solid. Depending on the mineral content present in the water, duration of the project, and operation needs, the chemical(s) can be applied continuously or in scale-squeeze applications.

In a further embodiment, the present invention provides that any previous embodiment may further comprise at least one scale inhibitor agent, wherein said scale inhibitor agent may be, but is not limited to, amino-tris-(methylenephosphonate)(AMP), 2-hydroxyethyl-amino-bis(methylenephosphonate) (HEABMP), ethylene-diamine-tetrakis (methylene-phosphonate) (EDTMP), tetramethylenediamine-tetrakis-(methylenephosphonate) (TDTMP), hexamethylenediamine-tetrakis(methylene-phosphonate) (HDTMP), 2-phosphonobutane-1,2,4-tricarboxylate (PBTC), hydroxyethylydene-1,1-diphosphonate (HEDP), diethylenetriamine-pentakis(methylenephosphonate) (DETPMP), acrylic acid (AA), 2-acrylamido-2-methylpropane sulfonic acid (AMPS), a copolymer of acrylamide and sodium acrylate, a copolymer of acrylamide and AMPS, a copolymer made by maleic anhydride and a copolymer of acrylic acid (AA) and AMPS, 2-hydroxy phosphonoacetic acid (HPAA; in the present disclosure, some examples used a commercial product such as Telogen T-74700 (CHEMICO® International, INC.) in which the primary active ingredient is 2-hydroxyphosphonoacetic acid), sodium polycarboxylate, and any combination thereof.

Some superwetting surfactants, such as a siloxane-based surfactant such as Dynol™ 960, may provide desired equilibrium and dynamic surface tension reduction in a wide range of aqueous formulations. Some superwetting surfactants may provide superwetting on difficult-to-wet substrates and provide superior substrate wetting with low foam. Some superwetting surfactants may also provide good flow and leveling under diverse application conditions.

In yet a further embodiment, the present invention provides that any previous embodiment may further comprise at least one superwetting surfactant, wherein said superwetting surfactant may be but is not limited to di- or tri-siloxane glycol ethers, amine glycol ethers of the formula $H_2N-(CH_2)_x-(OCH_2CH_2)_y-OH$, where x=2-4 and y=4-10, low volatile organic content acetylenic diols, di- or tri-siloxane glycerol polymers with a glycerol based hydrophilic head, amine glycerol polymers with a glycerol based hydrophilic head, siloxane-based surfactant, and any combination thereof.

In a further embodiment, the present invention provides that any previous embodiment may further comprise at least one corrosion inhibitor, wherein said corrosion inhibitor may be but is not limited to isopropanol, methanol, formic acid, propanetricarboxylic acid, butanetricarboxylic acid, polyaspartic acid, lactic acid, 4-hydroxybenzoic acid, hydroxyethane-diphosphonic acid, hydroxyphosphonoacetic acid, acetaldehyde, citric acid, aluminum bisulfite, and N,N-dimethyl formaldehyde.

In yet a further embodiment, the present invention provides that any previous embodiment may further comprise at least one additional surfactant, wherein said surfactant may be but is not limited to sodium lauryl sulfate, naphthalene, isopropyl alcohol, 2-butoxyethanol, cocoamidopropyl betaine, decyl glucoside, coco-glucoside, and lauryl glucoside.

In one embodiment, the present invention provides a solid carrier-based formulation by treating the solid carrier with a microemulsion composition of the present invention, wherein the solid carrier is selected from guar, guar gum, and guar derivatives such as hydroxypropyl guar or carboxymethyl hydroxypropyl guar; mineral earths, e.g. fumed silica, precipitated silica, silicates, silica gels, silicon dioxide, talc, kaolins, limestone, lime, chalk, clays, dolomite, diatomaceous earth, bentonite, montmorillonites, and laponite; inorganic salts, e.g. aluminum sulfate, calcium sulfate, copper sulfate, iron sulfate, magnesium sulfate, silicon sulfate, and magnesium oxide; polysaccharides, e.g. cellulose and starch; fertilizers, e.g., ammonium sulfate, ammonium phosphate, and ammonium nitrate; products of vegetable origin, e.g. cereal meal, tree bark meal, wood meal, and nutshell meal; polysaccharides; grain flours suitable for use in the present disclosure, e.g. flours from corn, rice, wheat, barley, sorghum, millet, oat, triticale, rye, buckwheat, fonio, and quinoa; a polymeric carrier such as thermoplastic polymers or copolymers, elastomers, or thermoplastic elastomers; and any combination thereof.

In one embodiment, the solid carrier is selected from the group consisting of guar, guar gum, hydroxypropyl guar, carboxymethyl hydroxypropyl guar, fumed silica, precipitated silica, silicates, silica gels, silicon dioxide, laponite, thermoplastic polymers or copolymers, elastomers or thermoplastic elastomers, and any combination thereof.

In one embodiment, a solid carrier is coated with a microemulsion composition of the present invention.

In one embodiment, the weight percentage of a solid carrier of the total weight of the solid carrier-based formulation is 5-95%, 5-85%, 5-75%, 5-65%, 5-55%, 5-45%, 5-35%, or 5-25%. In one embodiment, the weight percentage of a solid carrier of the total weight of the solid carrier-based formulation is 15-95%, 15-85%, 15-75%, 15-65%, 15-55%, 1 545%, 15-35%, or 15-25%. In one embodiment, the weight percentage of a solid carrier of the total weight of the solid carrier-based formulation is 25-95%, 25-85%, 25-75%, 25-65%, 25-55%, 25-45%, or 25-35%. In one embodiment, the weight percentage of a solid carrier of the total weight of the solid carrier-based formulation is 35-95%, 35-85%, 35-75%, 35-65%, 35-55%, or 35-45%. In one embodiment, the weight percentage of a solid carrier of the total weight of the solid-based formulation is 45-95%, 45-85%, 55-75%, or 55-65%. In one embodiment, the weight percentage of a solid carrier of the total weight of the solid carrier-based formulation is 55-95%, 55-85%, 55-75%, or 55-65%. In one embodiment, the weight percentage of a solid carrier of the total weight of the solid carrier-based formulation is 65-95%, 65-85%, or 65-75%. In one embodiment, the weight percentage of a solid carrier of the total weight of the solid carrier-based formulation is 75-95% or 75-85%. In one embodiment, the weight percentage of a solid carrier of the total weight of the solid carrier-based formulation is 85-95%. In one embodiment, the weight percentage of a solid carrier of the total weight of the solid carrier-based formulation is about 30%, 40%, 50%, 60%, 70%, 80%, or 90%.

In yet a further embodiment, the present invention provides a method of preparing a microemulsion composition of the present invention, comprising blending said glycol ether, terpene, ethoxylated alcohol, polyoxyethylene sorbitan ester, and fluid carrier to provide a substantially transparent microemulsion composition.

In yet a further embodiment, the present invention provides a method for treating an oil or gas well comprising introducing a microemulsion composition of the present invention into an oil or gas well.

In any embodiment of the present invention, the weight percentage of glycol ether may be in the range of about 2 to about 30% by weight. A more preferred range may be in the range of about 5 to about 20% by weight. An even more preferred range may be in the range of about 8 to about 15% by weight.

In any embodiment of the present invention, the weight percentage of terpene may be in the range of about 0.1 to about 20% by weight. A more preferred range may be in the range of about 0.5 to about 3% by weight. An even more preferred range may be in the range of about 0.8 to about 1.2% by weight.

In any embodiment of the present invention, the weight percentage of ethoxylated alcohol may be in the range of about 0.5 to about 20% by weight. A more preferred range may be in the range of about 2 to about 12% by weight. An even more preferred range may be in the range of about 5 to about 8% by weight.

In any embodiment of the present invention, the weight percentage of polyoxyethylene sorbitan ester may be in the range of about 0.5 to about 20% by weight. A more preferred range may be in the range of about 1 to about 8% by weight. An even more preferred range may be in the range of about 2 to about 5% by weight.

In one embodiment of the present invention, the weight percentage of the optional scale inhibitor may be in the range of about 0.001 to about 20% by weight. In one embodiment, the weight percentage may be in the range of about 0.1 to 10%, 0.2-10%, 0.3-10%, 0.4-10%, 0.5-10%, 0.6-10%, 0.7-10%, 0.8-10%, 0.9-10%, 1-10%, 2-10%, 3-10%, 4-10%, 5-10%, 6-10%, 7-10%, 8-10%, or 9-10%.

In one embodiment of the present invention, the weight percentage of the optional superwetting agent may be in the range of about 0.0001 to about 10% by weight. A more preferred range may be in the range of about 1 to about 5% by weight.

In any embodiment of the present invention, the weight percentage of the optional additional surfactant may be in the range of about 0.01 to about 15% by weight. A more preferred range may be in the range of about 0.5 to about 2% by weight.

In any embodiment of the present invention, the weight percentage of the carrier fluid may be in the range of about 10 to about 95% by weight. A more preferred range may be in the range of about 30 to about 90% by weight.

In one embodiment of the present invention, the weight percentage of the carrier fluid is 50-90%, 60-90%, 70-90%, 80-90%, 50-80%, 60-80%, 70-80% of the total weight of the microemulsion composition.

In one embodiment of the present invention, the flash point of the microemulsion composition is at least 37° C., at least 50° C., at least 75° C., or at least 90° C.

In one embodiment of the present invention, the dosage of the treatment is 0.1-10 gpt (gallon per 1000 gallons, more specifically, gallon of microemulsion composition of the present invention per 1000 gallons of the liquid that is treated), 0.5-5 gpt, 1-3 gpt, or 1-2 gpt.

The weight percentage (%) value in the present invention refers to the percentage of the weight of a component of the weight of the whole microemulsion composition.

The term "about" in the present invention means±5% of a value. For example, a skilled artisan will appreciate that "a range from about 10% to about 20% by weight" will also cover a range of "9.5% to 21% by weight".

"Environmentally preferable" in the present invention primarily refers to a less flammable and therefore less hazardous property of the present invention because of the much higher flash point. For example, a currently available product on the market such as MA-844W has flash point of 25° C. However, the flash point of the exemplified Examples 1-4 in the present disclosure have significantly higher flash points that are at least 93° C.

Environmentally Preferable Microemulsion
Compositions (Examples 1-4)

Example 1

Add Glycol Ether DPM (Dow Chemical Company, 20.2 g) to a container. Then add polyoxyethylene sorbitan trioleate (6.0 g) and blend the mixture to provide a homogeneous solution. Then add D-limonene (2.1 g) to the formed solution, followed by water (160.4 g). The mixture becomes cloudy after water is added. Then add BIO-SOFT® N91-6 (Stephan Company, 12.0 g) to the aqueous mixture and blend until the mixture becomes transparent to provide Example 1 with the formulation as illustrated in Table 1.

TABLE 1

The formulation of Example 1

| Components in Example 1 | Weight percentage of components in Example 1 (%) |
|---|---|
| water | 80 |
| Glycol Ether DPM | 10 |
| Polyoxyethylene sorbitan trioleate | 3 |
| BIO-SOFT ® N91-6 | 6 |
| D-Limonene | 1 |

Examples 2-4 are prepared with essentially the same method as Example 1:

TABLE 2

The formulations of Examples 2-4

| Components in Examples | Weight percentage of components in Example 2 (%) | Weight percentage of components in Example 3 (%) | Weight percentage of components in Example 4 (%) |
|---|---|---|---|
| water | 79.2 | 79.1 | 78.3 |
| Glycol Ether DPM | 10 | 10 | 10 |
| Polyoxyethylene sorbitan trioleate | 3 | 3 | 3 |
| BIO-SOFT ® N91-6 | 6 | 6 | 6 |
| D-Limonene | 0.9 | 0.9 | 0.9 |
| Telogen T-74700 | Not Available | 1 | 0.9 |
| Dynol ™ 960 | 0.9 | Not Available | 0.9 |

Gas Permeability Study

The purpose of the gas permeability study is to evaluate the effect of a composition of the present invention, more specifically, Example 1, on the effective gas permeability recovery. The gas permeability recovery with drainage of the fluid phase following treatment with Example 1 is compared to treatment with 2% KCl ("brine") alone at multiple and increasing flowing pressures. The higher effective gas permeability after the treatment of Example 1 demonstrates lowered capillary pressure within the sandstone porous formation due to the lowered water saturation level.

Permeability is an indication of the ability of fluids (gas or liquid) to flow through rock. High permeability will allow fluids to move rapidly through rocks. Permeability is affected by the pressure in a rock. The unit of permeability is darcy (d) or millidarcy (md).

A one-inch diameter by 2.5 inch long Ohio sandstone plug is vacuum saturated in American Petroleum Institute (API) standard brine solution and loaded in a core holder at conditions of about 500 psi (pounds per square inch) back (pore) pressure, 1500 psi net confining stress, and 107° C. The API standard brine permeability ($K_w$) is measured to insure the plug is within normal permeability range for Ohio sandstone (for later comparison to future tests if required).

Humidified gas flow is conducted at 120 psi in the production direction to de-saturate the plug and put it in a gas saturated state at residual water saturation (Swr). Flow direction is reversed and 2% KCl brine is injected for five pore volumes to simulate fluid loss into the fracture face. Gas flow is resumed in the original flow direction and flow conducted in pressure steps with a minimum of 2 hours flow at each pressure. Differential pressure steps used are: 10, 20, 40, 60, 90, and 120 psi (the system reaches residual water saturation at 120 psi). The actual time at each pressure step is recorded and repeated in subsequent gas steps. The permeability response with flow time is recorded for gas following the control treatment with 2% KCl.

The treatment is repeated with 2 gallon/1000 gallon (gpt refers to one gallon per 1000 gallons) of Example 1 in 2% KCl brine for five pore volumes in the opposite direction to gas flow. The gas flow stage is repeated for the same pressure steps and times. The effective gas permeability response is recorded as an overlay of the response after treatment with 2% KCl alone. The treatment is repeated two more times at 4 gpt and 6 gpt, each followed by the same gas flow steps.

Gas flow is initiated at 40 psi for with 2% KCl treatment. The first flow measurement provides an effective gas permeability of 0.002 md at a flow rate of 4 mL/min. As the treatment solution is displaced by the gas (drainage) the effective gas permeability ($K_g$) increases with flow time. At each flowing pressure the gas permeability stabilizes then increases further with the increase of flowing pressure. At 120 psi the gas permeability stabilizes near residual water saturation at 0.529 md, which is the reference control value of the treatment by 2% KCl solution alone.

Following treatment with 2 gallon/1000 gallon (gpt) of Example 1 in 2% KCl, the gas flow still initiates at 40 psi but at a high initial flow rate and effective gas permeability of 0.11 md. The gas permeability remains consistently higher through the pressure steps and ends at 0.588 md or 11.1% improvement compared to 0.529 md of the 2% KCl solution control study. Similarly, the gas permeability following treatments of 4 gpt and 6 gpt are higher than the previous step with the ending values of 0.687 md and 0.725 md, respectively.

In FIG. 1 (gas permeability response with Example 1-treated Ohio sandstone plug), the gas permeability test result demonstrates that Example 1 in the present invention provides 0.725 md at 6 gpt, which is 37% higher than the control study that uses 2% KCl aqueous solution. The substantially higher effective gas permeability is due to the capability of Example 1 to remove water from the sandstone sample and lower the capillary pressure within the sandstone sample.

Flash Point Test

The flash point temperature is one measure of the tendency of the test specimen to form a flammable mixture with air under controlled laboratory conditions The flash point in the present disclosure is measured according to ASTM D93-15 (ASTM refers to American Society for Testing and Materials).

Examples 1-4 demonstrated a flash point of at least 93.3° C.

We claim:

1. A microemulsion composition comprising:
    a glycol ether in an amount of 2 to 30% by weight, wherein the glycol ether is a compound according to Formula I:

$$R^1O[(C_mH_{2m})O]_nH \qquad \text{(Formula I)}$$

wherein $R^1$ is a $C_1$-$C_{12}$ straight or branched alkyl, m is 2 to 10, n is 1 to 10, and at least one of hydrogens on any carbon may be optionally substituted with —$OR^2$, Cl, or F, wherein ($C_mH_{2m}$) may be a straight or branched alkyl chain, and $R^2$ is H or a $C_1$-$C_6$ straight or branched alkyl;
    a terpene in an amount of 0.1 to 20% by weight;
    an ethoxylated alcohol in an amount of 0.5 to 20% by weight;
    a polyoxyethylene sorbitan ester in an amount of 0.5 to 20% by weight; and
    a carrier fluid in an amount of 10 to 95% by weight.

2. The microemulsion composition according to claim 1, wherein said glycol ether is selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof.

3. The microemulsion composition according to claim 1, wherein said terpene is D-Limonene.

4. The microemulsion composition according to claim 1, wherein said polyoxyethylene sorbitan ester is selected from the group consisting of polyoxyethylene sorbitan monooleate, polyoxyethylene sorbitan dioleate, polyoxyethylene sorbitan trioleate, polyoxyethylene sorbitan monopalmitate, polyoxyethylene sorbitan dipalmitate, polyoxyethylene sorbitan tripalmitate, and any combination thereof.

5. The microemulsion composition according to claim 4, wherein said polyoxyethylene sorbitan ester is polyoxyethylene sorbitan trioleate.

6. The microemulsion composition according to claim 1, wherein said carrier fluid comprises water or brine.

7. The microemulsion composition according to claim 1, comprising a glycol ether selected from the group consisting of $CH_3O[CH_2CH(CH_3)O]_2H$, $CH_3O[CH(CH_3)CH_2O]_2H$, $CH_3O(CH_2CH_2CH_2O)_2H$, and any combination thereof; D-Limonene; an ethoxylated alcohol; polyoxyethylene sorbitan trioleate; and water.

8. The microemulsion composition according to claim 1, further comprising a scale inhibitor, wherein said scale inhibitor is selected from the group consisting of aminotris-(methylenephosphonate) (AMP), 2-hydroxyethylamino-bis(methylenephosphonate) (HEABMP), ethylenediamine-tetrakis (methylene-phosphonate) (EDTMP), tetramethylenediamine-tetrakis-(methylenephosphonate) (TDTMP), hexamethylenediamine-tetrakis(methylenephosphonate) (HDTMP), 2-phosphonobutane-1,2,4-tricarboxylate (PBTC), hydroxyethylydene-1,1-diphosphonate (HEDP), diethylenetriamine-pentakis(methylenephosphonate) (DETPMP), acrylic acid (AA), 2-acrylamido-2-methylpropane sulfonic acid (AMPS), a copolymer of acrylamide and sodium acrylate, a copolymer made by maleic anhydride and a copolymer of acrylic acid (AA) and AMPS, 2-hydroxy phosphonoacetic acid (HPAA), sodium polycarboxylate, and any combination thereof.

9. The microemulsion composition according to claim 1, further comprising a superwetting surfactant, wherein said superwetting surfactant is selected from the group consisting of di- or tri-siloxane glycol ethers, amine glycol ethers of the formula $H_2N(CH_2)_x$—$(OCH_2CH_2)_y$—$OH$, where x=2-4 and y=4-10, low volatile organic content acetylenic diols, di- or tri-siloxane glycerol polymers with a glycerol based hydrophilic head, amine glycerol polymers with a glycerol based hydrophilic head, siloxane-based surfactant, and any combination thereof.

10. The microemulsion composition according to claim 1, further comprising a low hydrophile-lipophile balance (HLB) surfactant, wherein said low hydrophile-lipophile balance (HLB) surfactant is selected from the group consisting of sodium lauryl sulfate, naphthalene, N,N-dimethyl-9-decenamide, isopropyl alcohol, 2-butoxyethanol, cocoamidopropyl betaine, decyl glucoside, coco-glucoside, and lauryl glucoside.

11. The microemulsion composition according to claim 1, further comprising a corrosion inhibitor, wherein said corrosion inhibitor is selected from the group consisting of isopropanol, methanol, formic acid, propanetricarboxylic acid, butanetricarboxylic acid, polyaspartic acid, lactic acid, 4-hydroxybenzoic acid, hydroxyethane-diphosphonic acid, hydroxyphosphonoacetic acid, acetaldehyde, citric acid, aluminum bisulfite, and N,N-dimethyl formaldehyde.

12. The microemulsion composition according to claim 1, wherein the weight percentage of said carrier fluid is in the range of 50 to 90%, and said carrier fluid comprises water or brine.

13. The microemulsion composition according to claim 1, wherein the microemulsion composition has a flash point of at least 50° C.

* * * * *